Figure 1:
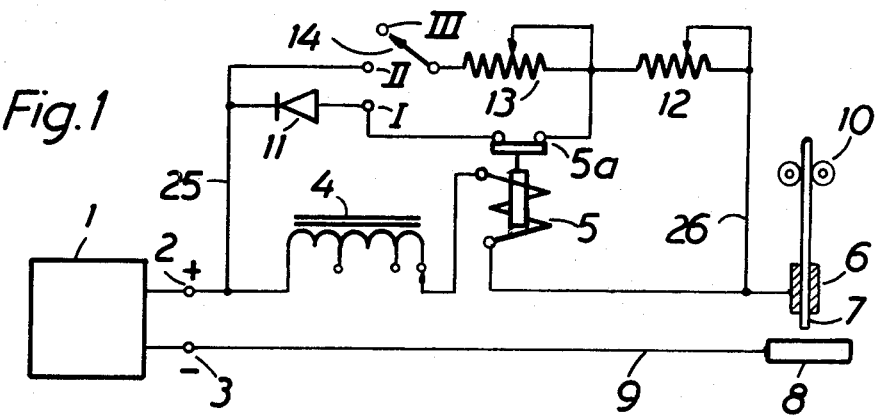

United States Patent [19]
Weman

[11] 3,739,139
[45] June 12, 1973

[54] APPARATUS FOR SHORT CIRCUIT ELECTRIC ARC WELDING
[75] Inventor: Klas Bertil Weman, Laxa, Sweden
[73] Assignee: Elektriska Suetsningsaktiebolaget, Gothenburg, Sweden
[22] Filed: Jan. 5, 1971
[21] Appl. No.: 103,983

[30] Foreign Application Priority Data
Jan. 14, 1970 Sweden.................................. 387/70

[52] U.S. Cl............................ 219/131 R, 219/137
[51] Int. Cl............................................. B23k 9/10
[58] Field of Search .................. 219/137, 135, 131; 307/100, 104, 106, 131, 152

[56] References Cited
UNITED STATES PATENTS
3,657,724  4/1972  Feeley et al. ....................... 219/137
3,099,789  7/1963  Perkins................................. 323/9

FOREIGN PATENTS OR APPLICATIONS
1,209,913  10/1970  Great Britain...................... 219/135

Primary Examiner—Thomas J. Kozma
Assistant Examiner—George A. Montanye
Attorney—Cameron, Kerkam & Sutton

[57] ABSTRACT

A D.C. arc welding circuit containing a series inductor shunted by a branch containing a half-wave rectifier and a resistor. The rectifier is poled so as to block the current produced in said shunt branch by the voltage induced in the inductor on rise of the magnetic flux in the inductor.

5 Claims, 3 Drawing Figures

APPARATUS FOR SHORT CIRCUIT ELECTRIC ARC WELDING

This invention relates to apparatus for electric arc welding with a consumable electrode advanced at a constant rate and energized by a D.C. source of welding power through a circuit including an inductor. More particularly, the invention is concerned with apparatus of this type in which a winding of the inductor is connected to a shunt branch containing a half-wave rectifier poled to block a flow of current through said branch caused by the voltage induced in said winding on rise of the magnetic flux in said inductor. The invention is principally applicable to short arc welding (also referred to as welding with short-circuiting metal transfer) with a source of welding power having a substantially flat characteristic, or a characteristic having a slope not exceeding 8 volts per 100 amps.

In short arc welding, the welding process comprises a more or less regular series of short circuit intervals separated by arc intervals. Apparatus of the type referred to have been described (see British Pat. specification No. 1,209,913) in which the rectifier valve in the shunt branch serves to short-circuit the inductor throughout the arc interval. In the desired mode of action of the circuit, the welding current at the beginning of the short circuit interval suddenly increases to a value not far below the peak value of the short circuit current. This result is due to the fact that the half-wave rectifier becomes non-conductive as soon as the short circuit occurs and that, as a consequence thereof, the current flowing during the preceding arc interval through the fly-wheel circuit formed by the inductor and the rectifier is now compelled to flow through the welding electrode. A necessary condition of the action described is that the time constant L/R of the fly-wheel circuit referred to is high and that, consequently, the power dissipated in said circuit during the arc interval is low, as otherwise the current in said circuit will have dropped to a low value at the end of the arc interval. The apparatus has the disadvantage that the inductor, being short-circuited by the half-wave rectifier during the arc interval, can provide no contribution to the voltage surge required for the re-firing of the arc at the beginning of the arc interval. The welding circuit therefore has to be supplemented with an additional inductor not shunted by the rectifier or with other devices for providing said voltage surge or for controlling the short-circuit frequency.

It is an object of the invention to provide apparatus of the type referred to which, while capable of providing a substantial instantaneous rise of current at the beginning of the short-circuit interval following upon an arc interval, is also capable of providing a substantial voltage surge at the beginning of an arc interval.

Another object is the provision of apparatus of the type referred to capable of providing not only a smooth welding action during the welding process proper, but also a reliable starting of the welding process.

According to one feature of the invention, the shunt branch referred to contains a resistor in series with the half-wave rectifier.

Other objects, features and advantages will appear from the following more detailed description of illustrative embodiments of the invention, which will now be given in conjunction with the accompanying drawings.

Figure 3:
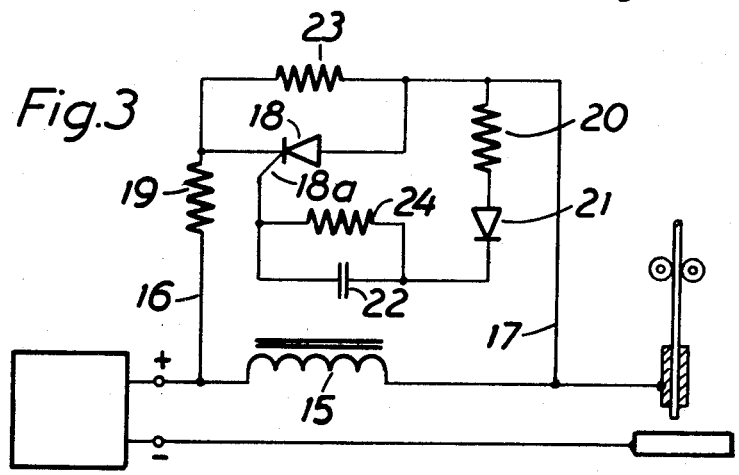
Figure 2:
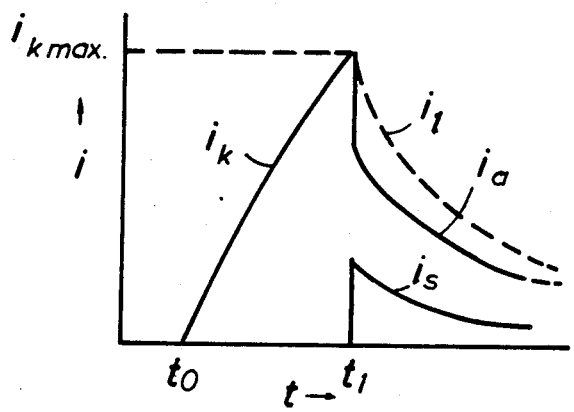

In the drawings,

FIG. 1 schematically shows an embodiment of the invention,

FIG. 2 is a current diagram illustrating the starting process obtained with the apparatus according to FIG. 1, and, FIG. 3 schematically shows a second embodiment of the invention.

In the apparatus according to FIG. 1 a welding circuit comprising an inductor 4, the winding of a current relay 5, a contact tube 6, a fusible electrode 7, a workpiece 8 and a return cable 9 is connected to the terminals 2, 3 of a D.C. source 1. The source 1 has a flat characteristic and may be either a rotary generator or a rectifier energized by a three-phase transformer. A schematically indicated wire advancing mechanism 10 serves in a known manner to advance the electrode 7 at an adjustable, constant rate. The inductor 4 is conducted in parallel with a branch containing a half-wave rectifier 11 in series with the back contact 5a of the current relay 5 and an adjustable resistor 12. The junction between the contact 5a and the resistor 12 is connected to one end of an adjustable resistor 13, the other end of which is connected to a three-way switch 14. In the position I of the switch the resistor 13 bridges the relay contact 5a. In the position II the resistor bridges the series connection of the rectifier 11 and the contact 5 a. In the position III the resistor 13 is out of circuit.

The statement that the welding current source 1 has a flat characteristic means, as usual, that the static short-circuit current on short circuit between the electrode and the workpiece amounts to several times the mean value of the welding current. As a rule, the characteristic is not quite horizontal but has a slope amounting to 3 – 8 volts per 100 amperes.

The current relay 5 provides a certain delay on energization as well as on deenergization. The output voltage of the source of welding power is assumed to be suitable for short arc welding, which means that said voltage is too low to be able at the other conditions present to maintain a steady state in which the arc burns continually.

In the following description of the operation of the apparatus the switch 14 is assumed to be set to position III. At the start of the welding operation the contact 5a is closed, the welding circuit carrying no current and the relay 5 being non-energized. At the moment $t_o$ in which the electrode tip makes contact with the workpiece, a short-circuit current $i_k$ starts to flow, said current increasing at the rate determined by the total inductance and the short-circuit resistance. The inductive voltage which is then produced across the inductor 4 tends to produce a current in the direction blocked by the rectifier 11, so that no current flows through the shunt branch. The short circuit is terminated and the arc is ignited at the time $t_1$ at which the short-circuit current has reached the value $i_{k\ max}$ required for fusion of the electrode (FIG. 2). The current through the inductor immediately starts to decrease, resulting in a change of direction of the induced voltage in the inductor winding, so that the rectifier 11 allows a flow of current $i_s$ through the shunt branch consisting of the resistor 12, the contact 5a and the rectifier 11. The arc current $i_a$ constitutes the difference between the inductor current $i_1$ and the current $i_s$ flowing in the shunt branch. The resistance of the resistor 12 is of such an order in relation to the effective resistance of the welding circuit that the current $i_a$ at the beginning of the arc period is substantially smaller than the total inductor current $i_1$, but on the other hand constitutes a substantial part of said inductor current. Said requirements regarding the magnitude of the resistance may be summarized by the statement that the resistance at decreasing current through the inductor should consume a substantial part of the liberated portion of the energy stored by the inductor. This ensures the supply to the arc of a current and a voltage which are sufficient to maintain the arc during a certain time but which are not so large as to cause too rapid a fusion of the electrode in the first moments. It is to be noted that the peak current $i_{k\ max}$ to which the current rises during the first short circuit and the corresponding energy stored in the inductor substantially exceed the current and the energy at the subsequent short circuits, as the electrode and the workpiece are cold, so that a comparatively large development of energy is required for the fusion of the electrode tip. With the conventional short arc welding circuit, in which all of the arc current passes through the inductor, there exists, therefore, the danger that the fusion of the electrode after the first short circuit occurs so rapidly that the arc length is increased to an extremely high value, resulting in extinguishment of the arc before the second short circuit, the decreasing current being no longer able to maintain an arc at the existing arc length. In the apparatus described, this danger is eliminated by the choice of a sufficiently low resistance of the resistor 12.

The delay of the operation of the relay 5 has to be sufficient to ensure that the contact 5a of the relay remains closed during at least the first short-circuit interval and the subsequent arc interval. As a rule, the first arc interval cannot with certainty be relied on to establish such conditions that the subsequent ignitions of the arc take place with the same ease as during the normal short arc welding process. The delay of the operation of the relay 5 therefore preferably is chosen so as to make the contact 5a remain closed during at least the first two short-circuit intervals and the arc intervals following immediately upon said short-circuit intervals. The time required for the attainment of stable and uniform welding conditions is determined by several factors, such as the material of the electrode and the workpiece, the electrode diameter and the rate of advancement. Consequently, the choice of the delay of the operation of the relay will also be dependent on said factors. In the welding of thin sheet with a steel electrode of the diameter 0.6 – 1.2 mm. satisfactory results have been obtained with delays between 0.3 and 0.5 seconds.

On the opening of the relay contact 5a, all of the welding current flows through the inductor 4, provided the switch is in the position III, as shown. With the switch in position I the inductor 4 is connected in parallel with a branch comprising the rectifier 11 in series with both of the resistors 12 and 13. This results in a current curve similar to the one shown in FIG. 2, with the difference that the current $i_s$ through the resistors 12, 13 as well as the difference between the inductor current $i_1$ and the arc current $i_a$ are proportionally smaller than in the case described. With the switch in the position II, the opening of the contact 5a disconnects the rectifier 11, while the series connection of the resistors 12 and 13 remains connected in parallel with the inductor 4 and in a known manner contributes to controlling the current curve during the welding process.

In the apparatus according to FIG. 3, the inductor 15 is connected by the conductors 16, 17 to a parallel branch containing a rectifier 18 in series with a resistor 19 corresponding to the resistor 12 of FIG. 1. Said rectifier 18 is a silicon controlled rectifier (thyristor), the control electrode or gate 18a of which forms part of a firing circuit extending from the conductor 17 through a resistor 20, a rectifier 21, a capacitor 22, the gate 18a and the resistor 19 to the conductor 16. The silicon controlled rectifier is connected in parallel with a resistor 23 corresponding to the resistor 13 in FIG. 1 with the switch in position II.

The silicon controlled rectifier 18 is non-conductive when no welding current flows and remains non-conductive during the first short circuit, the inductive voltage then present across the inductor 15 acting in the backward direction of the silicon controlled rectifier. On termination of the short circuit a current firing the silicon controlled rectifier flows through the firing circuit above described. Said current charges the capacitor 22 to a potential determined by the voltage acting in the firing circuit and by the time from the moment at which the ignition current starts to flow to the moment at which the charging of the capacitor is interrupted by the firing of the silicon controlled rectifier, said time being determined by the properties of the silicon controlled rectifier. The processes during the short-circuit interval and the subsequent first ignition of the arc largely correspond to those above described with reference to FIGS. 1 and 2.

For the reasons above discussed with reference to FIG. 1 it is advisable that the silicon controlled rectifier is rendered conductive during at least one arc interval in excess of the one following upon the first short circuit. This requires re-firing of the silicon controlled rectifier, as it is restored to the non-conductive state at every short circuit. The time constant of the charging circuit is therefore chosen in such a way that at least two successive firing pulses are required to increase the potential of the capacitor 22 to such a level that the next charging pulse is too weak to be able to ignite the silicon controlled rectifier.

The function of the discharging resistor 24 connected in parallel with the capacitor 22 is to discharge the capacitor on conclusion of a welding operation, so that firing of the silicon controlled rectifier can again take place. The time constant of the capacitor-resistor combination 22-24 may for instance be 0.5 to 1 second and must under no circumstances be so small that the capacitor during a short-circuit interval between two arc intervals is discharged to such a level that the next charging pulse will be sufficiently intense to fire the silicon controlled rectifier.

Alternatively, the conductors 16, 17 of FIG. 3 as well as the corresponding conductors 25, 26 of FIG. 1 may be connected to a secondary winding of the inductor 15 and 4, respectively.

As above described, the embodiments shown are provided with time delay means effecting a change of the welding circuit conditions at the end of a short start interval comprising a few (preferably not less than two) short circuit intervals, the circuit conditions before and after said change being adapted to provide reliable starting of the welding process and smooth welding, respectively. The embodiments described and their equivalents are especially useful for welding operations of the kind in which frequent re-starting of the welding process has to be effected, for instance in arc spot welding.

I claim:

1. Apparatus for electric arc welding comprising a D.C. source of welding power, a fusible electrode, means for advancing said electrode towards a workpiece at a constant rate, first circuit means connecting a first terminal of said source of welding power to said electrode, second circuit means connecting a second terminal of said source of welding power to the workpiece, said first circuit means comprising an inductor connected in series between the first terminal and the electrode, a shunt branch connected between spaced-apart points of a winding of said inductor, said shunt branch containing a resistor in series with a half-wave rectifier poled so as to block a flow of current through said branch caused by the voltage induced in said winding on rise of the welding current through said inductor, and delayed operation switching means responsive to a flow of welding current for reducing the conductivity of said branch in respect of currents having the direction admitted by said half-wave rectifier.

2. Apparatus for electric arc welding comprising a D.C. source of welding power, a fusible electrode, means for advancing said electrode towards a workpiece at a constant rate, first circuit means connecting a first terminal of said source of welding power to said electrode, second circuit means connecting a second terminal of said source of welding power to the workpiece, said first circuit means comprising an inductor connected in series between the first terminal and the electrode, a shunt branch connected between spaced-apart points of a winding of said inductor, said shunt branch containing a resistor in series with a silicon controlled rectifier poled to allow when conducting a flow of current through said branch caused by the voltage induced in said winding on decrease of the welding current through said inductor, a firing circuit connected between the anode lead and the gate lead of said silicon controlled rectifier for causing a firing current to flow from said anode lead through said firing circuit into said gate as soon as a positive voltage differential appears between the anode lead and the cathode lead of said silicon controlled rectifier, and means for rendering said firing circuit inoperative after a predetermined period.

3. Apparatus for electric arc welding comprising a D.C. source of welding power, a fusible electrode, means for advancing said electrode towards a workpiece at a constant rate, first circuit means connecting a first terminal of said source of welding power to said electrode, a second circuit means connecting a second terminal of said source of welding power to the workpiece, said first circuit means comprising an inductor connected in series between the first terminal and the electrode, a shunt branch connected across spaced-apart points of a winding of said inductor, said shunt branch containing a resistor in series with a silicon controlled rectifier poled to block a flow of current through said branch caused by the voltage induced in said winding on rise of the welding current through said inductor, and a firing circuit for said silicon controlled rectifier comprising a capacitor, a charging resistor and a half-wave rectifier connected in series between the anode lead and the gate lead of the silicon controlled rectifier, said half-wave rectifier being poled so as to allow the flow of a positive current from said anode lead to said gate lead and said capacitor having sufficient capacity to ensure that at least two successive firing pulses are required to charge the capacitor to a voltage at which subsequent charging pulses are too weak to fire the silicon controlled rectifier.

4. Apparatus as claimed in claim 3 in which the capacitor is shunted by a bleeder resistor providing discharge of the capacitor on conclusion of a welding operation.

5. Apparatus as claimed in claim 3 which further comprises a by-pass resistor connected between the anode lead and the cathode lead of the silicon controlled rectifier.

* * * * *